United States Patent
Broz et al.

(10) Patent No.: US 10,203,865 B2
(45) Date of Patent: Feb. 12, 2019

(54) DOCUMENT CONTENT REORDERING FOR ASSISTIVE TECHNOLOGIES BY CONNECTING TRACED PATHS THROUGH THE CONTENT

(71) Applicant: International Business Machines Corporation, Armonk, NY (US)

(72) Inventors: Michal Broz, Austin, TX (US); Steven D. Clay, Round Rock, TX (US); Richard S. Schwerdtfeger, Round Rock, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 14/468,288

(22) Filed: Aug. 25, 2014

(65) Prior Publication Data

US 2016/0055138 A1 Feb. 25, 2016

(51) Int. Cl.
*G06F 17/00* (2006.01)
*G06F 3/0488* (2013.01)
(Continued)

(52) U.S. Cl.
CPC ........ *G06F 3/0488* (2013.01); *G06F 3/04847* (2013.01); *G06F 17/212* (2013.01); *G06F 17/2229* (2013.01); *G06F 17/241* (2013.01)

(58) Field of Classification Search
CPC .......... G06F 17/30905; G06F 17/2247; G06F 17/242; G06F 3/0481; G06F 3/0488;
(Continued)

(56) References Cited

U.S. PATENT DOCUMENTS

| 7,225,405 B1 * | 5/2007 | Barrus | G06F 3/0481 |
| | | | 707/E17.009 |
| 7,870,503 B1 * | 1/2011 | Levy | G06F 9/4443 |
| | | | 707/797 |

(Continued)

OTHER PUBLICATIONS

Takagi, H. et al.,"Research Report: Technology Advances and Standardization Toward Accessible Business Graphics," IBM Research, Tokyo Research Laboratory, © Jul. 22, 2007, 10 pages.*

(Continued)

*Primary Examiner* — Cesar B Paula
*Assistant Examiner* — James H. Blackwell
(74) *Attorney, Agent, or Firm* — Steven M. Greenberg, Esq.; Shutts & Bowen LLP

(57) ABSTRACT

Embodiments of the present invention provide a method, system and computer program product for document content re-ordering for assistive technology processing. In an embodiment of the invention, a method for document content re-ordering for assistive technology processing is provided. The method includes sensing in a computer display a drawing of a path across different portions of displayed content in the computer display. Thereafter, a sequence of the different portions of the displayed content can be identified from the path. As such, meta-data indicative of the sequence can be generated in the memory of the computer and the content can be annotated with the generated meta-data. Finally, the portions of the content can be processed with assistive technology in an order dictated by the sequence.

11 Claims, 1 Drawing Sheet

(51) Int. Cl.
*G06F 17/24* (2006.01)
*G06F 17/21* (2006.01)
*G06F 3/0484* (2013.01)
*G06F 17/22* (2006.01)

(58) Field of Classification Search
CPC .. G06F 17/212; G06F 17/2229; G06F 17/241; G06F 3/0487; G09B 21/006; H04M 3/4938
See application file for complete search history.

(56) References Cited

U.S. PATENT DOCUMENTS

| | | | | |
|---|---|---|---|---|
| 8,028,240 | B2 | 9/2011 | Stephen et al. | |
| 8,340,424 | B2* | 12/2012 | Sato | G06K 9/344 382/173 |
| 8,423,916 | B2 | 4/2013 | Chihara | G06F 3/04883 345/156 |
| 8,572,480 | B1* | 10/2013 | Goodwin | G06F 17/212 382/173 |
| 8,619,272 | B2* | 12/2013 | Seabright | G06F 3/1206 358/1.13 |
| 8,964,201 | B2* | 2/2015 | Seabright | G06F 3/1206 358/1.13 |
| 9,268,753 | B2* | 2/2016 | Hendry | G06F 17/2247 |
| 2007/0168891 | A1* | 7/2007 | Damery | G10L 13/00 715/865 |
| 2007/0211071 | A1* | 9/2007 | Slotznick | G06F 17/30899 345/594 |
| 2008/0040692 | A1* | 2/2008 | Sunday | G06F 3/04883 715/863 |
| 2008/0222546 | A1* | 9/2008 | Mudd | G06F 17/30749 715/765 |
| 2009/0265612 | A1* | 10/2009 | Cheney | G06Q 10/107 715/234 |
| 2010/0058182 | A1* | 3/2010 | Jung | G06F 3/04883 715/702 |
| 2010/0074471 | A1* | 3/2010 | Kurzweil | G06F 3/017 382/103 |
| 2010/0289753 | A1* | 11/2010 | Coddington | G06F 3/0482 345/173 |
| 2011/0026827 | A1* | 2/2011 | Sato | G06K 9/00463 382/176 |
| 2011/0035705 | A1* | 2/2011 | Faenger | G06F 17/30053 715/811 |
| 2011/0249284 | A1* | 10/2011 | Seabright | G06F 3/1206 358/1.13 |
| 2012/0216150 | A1* | 8/2012 | Wernecke | G06F 3/04886 715/850 |
| 2013/0067366 | A1 | 3/2013 | Almosnino | |
| 2013/0071027 | A1* | 3/2013 | Sato | G06K 9/344 382/176 |
| 2013/0227480 | A1* | 8/2013 | Kim | G06F 3/04817 715/810 |
| 2014/0026101 | A1* | 1/2014 | Pallakoff | G06F 3/0482 715/841 |
| 2014/0181753 | A1* | 6/2014 | Kamii | G06F 3/04883 715/840 |
| 2014/0337033 | A1* | 11/2014 | Kim | A61H 3/061 704/260 |

OTHER PUBLICATIONS

Konicek, K. et al.,"Electronic Reserves: The Promise and Challenge to Increase Accessibility," © 2003, pp. 102-108.*
Ishihara, T. et al.,"Analyzing Visual Layout for a Non-Visual Presentation—Document Interface," © Oct. 22-25, 2006, ACM, pp. 165-172.*
Baker, D.L.,Adobe Acrobat 5: The Professional User's Guide, © 2002, Chapter 8, pp. 205-235.*
Drake, T.,"ARIA Flowto Controls the Reading Order of a Page," © Nov. 5, 2012, Yahoo Developer Network Blog, 2 pages.*
Hays, K.,"ARIA Web Design and Development Patterns," © 2012, IT Accessibility at Univ. Ill. Urbana-Champaign, 26 pages.*
Anonymous, "Method and System for Prioritized Rendering Portions of Presentation," © Jun. 7, 2011, IP.com Prior Art Database Technical Disclosure, 4 pages.*
Freedom Scientific,"JAWS ARIA Support," © Oct. 7, 2010, 11 pages.*
Sato, D. et al.,"What's Next? A Visual Editor for Correcting Reading Order," (C) 2009, IFIF Interational Federation for Information Processing, in INTERACT 2009, Part I, LNCS 5726, pp. 364-377.*
Acrobat Help, Touch Up Reading Order Tool for PDFs (Acrobat Pro), archived Jun. 27, 2014, WayBack Machine, <"https://web.archive.org/web/20140627164347/https://helpx.adobe.com/acrobat/using/touch-reading-order-tool-pdfs.html">, 7 pages.*

* cited by examiner

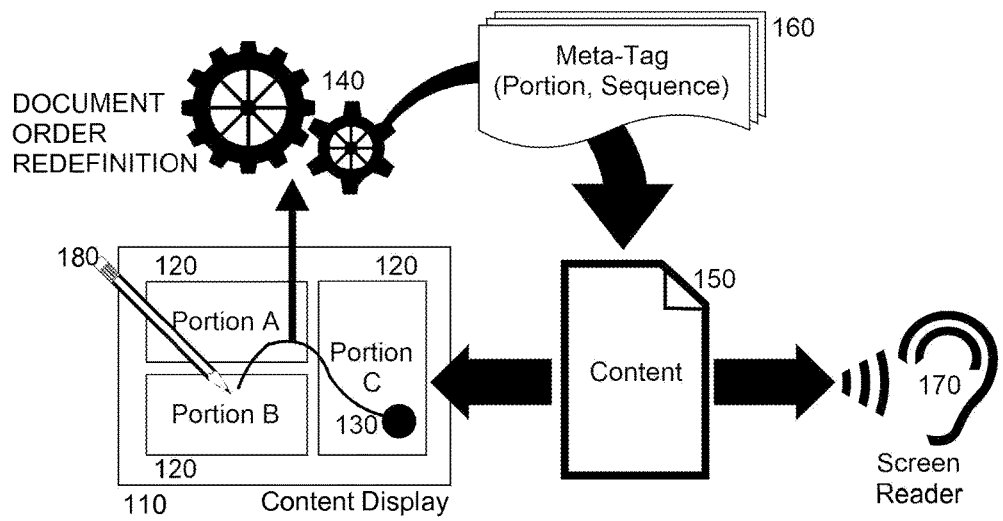
FIG. 1
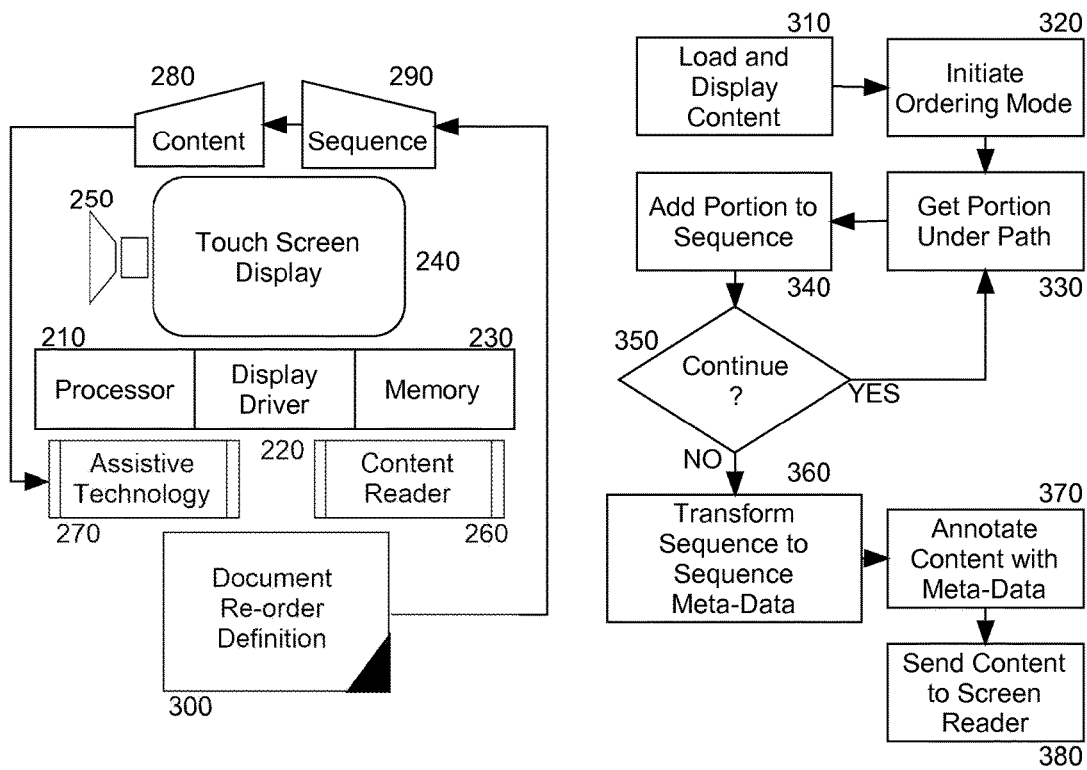
FIG. 2   FIG. 3

DOCUMENT CONTENT REORDERING FOR ASSISTIVE TECHNOLOGIES BY CONNECTING TRACED PATHS THROUGH THE CONTENT

BACKGROUND OF THE INVENTION

Field of the Invention

The present invention relates to assistive technologies and more particularly to document ordering for assistive technologies.

Description of the Related Art

In human-computer interaction, computer accessibility refers to the accessibility of a computer system to all end users irrespective of any disability or physical impairment. Accessibility reflects the notion that all end users ought to enjoy fluid access to digital content by way of a computing device despite any physical impairment of the end user such as a visual impairment, aural impairment, or tactile impairment. In particular, to the extent that much of the modern user interface relies upon each of the human tactile, visual and aural senses, a physical impairment of any of those sense, in the absence of a remedial user interface technology, can result in the inability of the impaired individual to interact with the user interface. Remedial technologies designed to overcome the impairment of an end user in respect to the tactile, aural or visual senses are known as "assistive technologies".

The venerable screen reader represents one popular assistive technology. A screen reader is a software application that attempts to identify and interpret what is being displayed on the screen of a computer, though as it will be apparent, the presence of a display of a computer is not consequential for the visually impaired end user when the computer has been supplemented by a screen reader. This interpretation produced by the screen reader then is re-presented to the user through the means of text-to-speech (TTS), sound icons, or a Braille output device. Screen readers are a form of assistive technology useful not only to the those who are visually impaired to the extent of blindness, but also to those who are visually impaired to a degree where vision is substantially inhibited but not foreclosed, and also to those who are illiterate or learning disabled. To wit, the screen reader can be combined with other technologies such as screen magnifiers so as to facilitate comprehension of a user interface.

Screen readers process content differently depending upon the nature of the content. In the context of Web content, screen readers most commonly "read" the content of a Web page in an order defined by a document object model (DOM) underlying the Web content. However, as a matter of best practices, it is industrially accepted that if a Web page can be navigated sequentially and the navigation sequences of the Web page affect meaning or operation, focusable components should receive focus in an order that preserves meaning and operability. This is not limited to focus navigation as assistive technologies also follow the logical flow of the document itself when browsing a web page, independent of focus navigation. Consequently, the Web page should be navigated by the screen reader in an order corresponding to the navigation sequence of the Web page. Additionally, mobility impaired users who are dependent on focus navigation will also be confused when the visual rendering of the focus sequence does not follow a logical document order. It is for these reasons that accessibility standards require that a document enable the ability to follow a logical navigation order.

Web content can incorporate meta-data so as to facilitate the sequence of presentation by a screen reader. In the hypertext markup language (HTML) version 5 specification, the "aria-flowto" property defines a logical reading order of a page configured for interaction with an assistive technology such as a screen reader. Likewise, the "draw:nav-order" tag defines a logical ordering of presentation in an open document format (ODF) compliant document. The portable document format (PDF) also provides for a tagging mechanism to specify a display order of components of a document. In each case, an assistive technology such as a screen reader can process the meta-data in order to determine an order in which to present content of a document.

Plainly, embedding sequencing meta-data in a document can be a laborious task. To facilitate the process, document editors can provide authoring tools for manual placing sequencing tags within a document. However, the utilization of authoring tools can be complicated and beyond the technical comprehension of most end users. Further, permitting a tech savvy end user to place navigation sequencing meta data into a document can frustrate the intent of the author of the document with respect to the sequencing of the presentation of content in the document. As such, content authors are generally compelled to create two versions of a document—a primary version and a version for processing with an assistive technology.

BRIEF SUMMARY OF THE INVENTION

Embodiments of the present invention address deficiencies of the art in respect to content sequencing and provide a novel and non-obvious method, system and computer program product for document content re-ordering for assistive technology processing. In an embodiment of the invention, a method for document content re-ordering for assistive technology processing is provided. The method includes the sensing in a computer display of the drawing of a path across different portions of content that has been displayed in the computer display. Thereafter, a sequence of the different portions of the displayed content can be identified from the path. As such, meta-data indicative of the sequence can be generated in the memory of the computer and the content can be annotated with the generated meta-data Finally, the portions of the content can be processed with assistive technology in an order dictated by the sequence. Alternatively, the portions of the content can be keyboard navigated in a content viewer in an order dictated by the sequence.

In another embodiment, a document data processing system can be configured for document content re-ordering for assistive technology processing. The system can include at least one processor, memory, a touch screen display and a display driver driving a display of content by a content reader executing in the memory on the touch screen display. The system further can include an assistive technology also executing in the memory and providing an alternative rendering of portions of the content according to a sequence specified by annotations of the portions of the content. Finally, the system can include a document re-ordering definition module also executing in the memory. The module can include program code enabled upon execution to sense in the display a drawing of a path across different portions of the content, to identify the sequence from the path, to generating in the memory meta-data indicative of the sequence, and to annotate the content with the generated meta-data.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for document content re-ordering for assistive technology processing;

FIG. 2 is a schematic illustration of a document data processing system configured for document content re-ordering for assistive technology processing; and, FIG. 3 is a flow chart illustrating a process for document content re-ordering for assistive technology processing.

DETAILED DESCRIPTION OF THE INVENTION

Embodiments of the invention provide for document content re-ordering for assistive technology processing. In accordance with an embodiment of the invention, a logical ordering mode can be provided in connection with a display of a document. Within the logical ordering mode, a pointing device can be applied to a portion of a visual representation of the document and the portion can be recognized. The pointing device thereafter can trace a path across the display traversing different other portions of the document. A sequence in which the portions are traversed can be recorded into memory as a sequence of presentation of portions of the document to be applied when the document is subjected to an assistive technology such as a screen reader. Thereafter, the sequence can be transposed into meta-data and embedded into the document thereby avoiding the necessity of the end user to utilize an authoring tool to manually place the meta-data into the document or having to reorder the entire document content. In this way, the document ordering produced by the path can be based on multi-factors, for instance, natural reading order, or based on user preference. The natural order can be based on human reading habit, for example, from top down and left right. However, the ordering by user preference can be based upon profession, interests, or personal choice. Consequently, a screen reader can audibly present the document in the order of the preference, rather than the natural order.

In further illustration, FIG. 1 pictorially shows a process for document content re-ordering for assistive technology processing. As shown in FIG. 1, a content display 110 can be provided for content 150, for example a Web page for Web content. The content display 110 can present different portions 120 of the content specified in an order associated with the content 150, for example within a DOM for the content 150. Document order redefinition logic 140 can detect a path 130 drawn on the content display 110, for instance by a pointing device 180 such as a finger, stylus or mouse. The path 130 can specify a sequence in which the portions 120 are traversed, whether by an assistive technology or by keyboard navigation in a content viewer. The document order redefinition logic 140 then can translate the path 130 into meta-data 160 describing each portion 120 and a sequence in which the portions 120 are to be traversed in tab order during keyboard navigation, or read out by a screen reader 170. Finally, the content 150 can be annotated with the meta-data so as to enable the traversal of the portions 120 of the content by screen reader 170 or keyboard navigation in order to process the portions 120 of the content 150 in the order specified by the path 130.

The process described in connection with FIG. 1 can be implemented within a document data processing system such as a Web browser, document viewer or word processor, to name a few examples. In further illustration, FIG. 2 schematically shows a document data processing system configured for document content re-ordering for assistive technology processing. The system can include at least one processor 210, memory 230, a touch screen display 240 and a display driver 220 driving the display of content 280 in the memory 230 on the touch screen display 240 by a content reader 260. Also, assistive technology 270 such as a screen reader can execute in the memory 230 and can read out portions of the content 280 through audio circuitry 250 in an order specified by a sequence 290 evident from annotations in the content 280.

Of note, a document re-order definition module 300 can execute in the memory 230 by the processor 210. The module 300 can include program code that when executed by the processor 210 in the memory 230 of the system is enabled to detect entry into a re-ordering mode in which different portions of the content 280 are to be re-ordered for presentation by the assistive technology. The program code further can be enabled to identify an order in which a path drawn on the touch screen display traverses the different portions of the content 280. The program code of the module 300 even yet further can be enabled to translate the order of portion traversal evident within the path into the sequence 290. Finally, the program code of the module 300 can be enabled to annotate the content 280 with meta-data of the sequence 290. In this way, the assistive technology 270 can process the portions of the content 280 through the audio circuitry 250 in an order dictated by the sequence 290.

In even yet further illustration of the operation of the document re-order definition module 300, FIG. 3 is a flow chart illustrating a process for document content re-ordering for assistive technology processing. Beginning in block 310, content can be loaded and displayed in a touch screen display. Thereafter, in block 320, an ordering mode can be initiated. For instance, a menu choice or other user interface control can be activated in order to indicate entry into the ordering mode. In block 330, subsequent to entry into the ordering mode, an origin of a path to be drawn on the touch screen display can be detected, for instance by sensing a touching of a stylus or finger, by sensing a proximity of a stylus or finger, by tracking an eye gaze of an end user, or through mouse or keyboard directives for the placement and movement of a cursor. Thereafter, a portion of the content traversed by the path can be identified. Thereafter, in block 340 the identified portion can be added to a list of portions traversed by the path.

In decision block 350, it can be determined if the ordering mode remains active. If so, in block 330 a next portion traversed by the path can be identified and added to the list of portions traversed by the path. Optionally, the path can be discontinuous. That is, an initial path can be drawn on the touch screen display traversing one or more portions of the content and then terminated. Thereafter, a new path can originate at a different portion of the content and can continue traversing additional portions of the content. So long as the ordering mode remains in effect, the disjointed paths can be logically merged in as much as the traversed portions of the content can be added in traversal order to the list of portions traversed by the path. In decision block 350, when no further portions are to be traversed by the path, the ordering mode can end.

In block 360, once the ordering mode has ended, the list of the portions traversed by the path or paths can be transposed into meta-data indicative of a sequence in which the portions are to be presented by a screen reader. For example, in the context of Web content, a set of "aria-flowto" directives can be generated indicating for each portion a next portion of the content to be processed. As another example, in the context of a document, a set of ODF "draw:nav-order" directives can be generated indicating for each portion a next portion of the content to be processed. In either circumstance, the content can be annotated with the meta-data in block 370 and in block 380, the content with annotations can be provided to the screen reader for audible processing of the different portions of the content in the order dictated by the annotations.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A document data processing system configured for document content re-ordering for assistive technology processing, the system comprising:
    at least one processor, memory, a touch screen display and a display driver driving a display of a single page of a document by a content reader executing in the memory on the touch screen display;
    an assistive technology also executing in the memory and assistively processing portions of the single page of a document according to a sequence specified by annotations of the portions of the single page of a document; and,
    a document re-ordering definition module also executing in the memory, the module comprising program code enabled upon execution to enter an ordering mode and during the ordering mode, to sense in the display a drawing of an initial path across different portions of the single page of a document beginning at an originating position of the initial path and ending at a terminating position, to identify an initial sequence from the path, to sense multiple additional, disjointed paths drawn across other different portions of the single page of the document each additional disjointed path defining an additional sequence, to add the initial sequence to a list and also adding to the list each additional sequence and while still in ordering mode, attaching a first one of the additional sequences to the initial sequence in the list, and further attaching each additional sequence to an end of a prior additional sequence in the list so as to define a traversal order of items of each of the sequences for a screen reader, to exit the ordering mode and thereafter to store the list in memory and process the list by transposing the list into meta-data indicative of a combined sequence of the initial sequence and the additional sequence in the list, and to annotate the single page of a document with the generated meta-data so as to direct a screen reader to present different corresponding portions of the single displayed page in accordance with a sequence defined by the meta-data.

2. The system of claim 1, wherein the assistive technology is a screen reader.

3. The system of claim 1, wherein the meta-data is a set of aria-flowto directives.

4. The system of claim 1, wherein the meta-data is a set of draw:nav-order directives.

5. A computer program product for document content re ordering, the computer program product comprising a non-transitory computer readable storage medium having program instructions embodied therewith, the program instructions executable by a device to cause the device to perform a method comprising:
    entering an ordering mode of the device and during the ordering mode, sensing in a computer display by the device of a drawing of an initial path across different portions of single displayed page of a document in the computer display beginning at an originating position of the initial path and ending at a terminating position, identifying by the device from the initial path an initial sequence of the different portions of the single displayed page of the document, sensing multiple additional, disjointed paths drawn across other different portions of the single page of the document each additional disjointed path defining an additional sequence;
    adding the initial sequence to a list and also adding to the list each additional sequence and while still in ordering mode, attaching a first one of the additional sequences to the initial sequence in the list, and further attaching each additional sequence to an end of a prior additional sequence in the list so as to define a traversal order of items of each of the sequences for a screen reader; and,
    exiting the ordering mode and thereafter, storing the list in memory and process the list by transposing the list into meta-data indicative of a combined sequence of the initial sequence and the additional sequence in the list and, annotating by the device the single displayed page of the document with the generated meta-data so as to direct a screen reader to present different corresponding portions of the single displayed page in accordance with a sequence defined by the meta-data.

6. The computer program product of claim 5, further comprising program instructions executable by the device to cause the device to process by the device the portions of the single displayed page of the document with assistive technology in an order dictated by the combined sequence.

7. The computer program product of claim 6, wherein the assistive technology is a screen reader.

8. The computer program product of claim 5, further comprising program instructions executable by the device to cause the device to keyboard navigate the portions of the single displayed page of the document in a content viewer in an order dictated by the combined sequence.

9. The computer program product of claim 5, wherein the meta-data is a set of aria-flowto directives.

10. The computer program product of claim 5, wherein the meta-data is a set of draw:nav-order directives.

11. The computer program product of claim 5, wherein the sensing is a touch sensing of a touching of the computer display during drawing of the path.

\* \* \* \* \*